United States Patent
Zeng

(10) Patent No.: US 11,378,418 B2
(45) Date of Patent: Jul. 5, 2022

(54) PROBE SWITCHING DEVICE

(71) Applicant: SONOTECHO BIOMEDICAL CO., LTD., Guangdong (CN)

(72) Inventor: Yunquan Zeng, Guangdong (CN)

(73) Assignee: SONOTECHO BIOMEDICAL CO., LTD., Shenzhen (CN)

(*) Notice: Subject to any disclaimer, the term of this patent is extended or adjusted under 35 U.S.C. 154(b) by 188 days.

(21) Appl. No.: 16/875,273

(22) Filed: May 15, 2020

(65) Prior Publication Data

US 2021/0215509 A1 Jul. 15, 2021

Related U.S. Application Data

(63) Continuation of application No. PCT/CN2020/071961, filed on Jan. 14, 2020.

(51) Int. Cl.
*G01D 5/14* (2006.01)
*G01D 5/34* (2006.01)
*B06B 1/02* (2006.01)

(52) U.S. Cl.
CPC ........... *G01D 5/145* (2013.01); *B06B 1/0207* (2013.01); *G01D 5/34* (2013.01)

(58) Field of Classification Search
CPC ...... H01H 19/626; H01H 23/14; H01H 19/11; H01H 19/62; H01H 19/623
See application file for complete search history.

(56) References Cited

U.S. PATENT DOCUMENTS

| 2,943,161 A * | 6/1960 | Fath | H01H 3/26 200/38 BA |
| 4,789,765 A * | 12/1988 | Berg | H01H 1/403 200/245 |
| 2020/0400744 A1* | 12/2020 | Tsai | G01R 31/3277 |

FOREIGN PATENT DOCUMENTS

CN 108933375 A 12/2018

* cited by examiner

*Primary Examiner* — Noam Reisner

(57) ABSTRACT

A probe switching device comprising at least two switching switch assemblies and at least two probes, wherein each of the switching switch assemblies corresponds to each of the probes, each of the switching switch assemblies comprises a first switch component and a second switch component, the first switch component is provided with a force applying block, and the second switch component mainly consists of two fixed contactors and a bridge contactor, each of the probes corresponding to each of the switching switch assemblies is connected to one of the two fixed contactors. Thereby, the probe can be switched using the switching switch assembly without using a relay, the force applying block acts on the bridge contactor to connect the first switch component and the second switch component.

8 Claims, 4 Drawing Sheets

PROBE SWITCHING DEVICE

CROSS-REFERENCE TO RELATED APPLICATION

The present application is a continuation of International Application No. PCT/CN2020/071961, filed on Jan. 14, 2020, the entire content of which is incorporated herein by reference.

TECHNICAL FIELD

The present application relates to a switching mechanism, in particular to a probe switching device.

BACKGROUND

In current ultrasonic testing devices, relays are usually used to control the switching of probes, the principle thereof is to configure a corresponding relay group for each probe, and the system switches the probes by controlling the state of the relay group. If the probe is 128 array elements, then the relay group controlling the probes requires 128 relay units. According to the two status modes of the relay, the relay group can also be matched with a 128-element probe. When there are 3 probes, a set of relay group that can meet the probe channel needs to be added.

If there are 5 probes and each probe has 128 channels, then when relays are used to control the switching, 3 sets of relays are needed, there are up to 384 relays, the number is quite large, and there are many wires, which is difficult to wire, inconvenient to produce and install, and easy to result in cross interference of signals and affects image quality.

SUMMARY

Technical Problem

The technical problem to be solved by the present application is to provide a switching device of a probe device to improve the problems of signal transmission attenuation and interference caused by the complex circuit of the relay.

Technical Solution

In order to solve the above technical problem, the technical solution adopted by the present application is: a probe switching device, which comprises at least two switching switch assemblies and at least two probes, wherein each of the switching switch assemblies corresponds to each of the probes, each of the switching switch assemblies comprises the first switch component and the second switch component, the first switch component is provided with a force applying block, the second switch component mainly consists of a bridge contactor and two fixed contactors, and each of the probes corresponding to each of the switching switch assemblies is connected to one of the two fixed contactors, the bridge contactor can be controlled to be in contact with or be disengaged from the two fixed contactors by moving the bridge contactor.

In particular, when the force applying block is pressed against the bridge contactor, the bridge contactor is in contact with the two fixed contactors in such a way that the two fixed contactors are electrically connected.

In particular, an electrical signal passes through the bridge contactor and the two fixed contactors to reach the corresponding probe, and the corresponding probe converts the collected information into an electrical signal, and transmits the electrical signal back, the current probe is switched to the probe corresponding to the switching switch assembly.

Specifically, the bridge contactor comprises a pressing block and a connecting bridge, the pressing block is connected to the connecting bridge, the connecting bridge is close to the two fixed contactors, the connecting bridge is mainly made of conductive material, the pressing block is mainly made of non-conductive material, the force applying block applies pressure to the pressing block, and the pressing block pushes the connecting bridge.

Preferably, the probe switching device further comprises at least one switching rotating shaft; the first switch component is arranged in the axial direction of the switching rotating shaft.

Further, the first switch component is circumferentially distributed on the switching rotating shaft.

Further, the second switch component is provided with an elastic structure, the elastic structure is provided between the two fixed contactors, and the elastic structure corresponds to the bridge contactor.

Preferably, the probe switching device further comprises a probe control board, at least two first sensing components and at least two second sensing components, each of the first sensing components is circumferentially distributed on the switching rotating shaft, and each of the second sensing components is provided on the probe control board.

In particular, each of the first sensing components comprises a sensor, each of the second sensing components comprises a signal source, the sensor corresponds to the signal source, the sensor corresponds to the switching switch assembly, and the sensor is used to control the on/off of the switching switch assembly.

Alternatively, a roller is provided on the outer side of the force applying block.

Further, the probe switching device further comprises a fixed board, the probe control board is fixed to the fixed board, the switching rotating shaft is suspended and connected to the fixed board, and the probe control board is provided between the switching rotating shaft and the fixed board.

Further, the probe switching device further comprises a rotatable structure and a power structure, the power structure drives the switching rotating shaft through the rotatable structure, and the sensor controls the rotation of the rotatable structure.

In particular, the power structure comprises a motor, and the rotatable structure comprises one or more selected from the group consisting of coupler, gear mechanism and rope connecting mechanism.

In the above, the sensor is a Hall sensor, and the signal source is a magnet.

Beneficial Effect

The beneficial effect of the present application is that the switching switch assembly is used to switch the probe without using a relay, the force applying block acts on the bridge contactor to connect the first switch component and the second switch component, which can reduce the overall signal consumption and help enhance the transmission effect with high image quality and without resulting in cross interference of signals. Correspondingly, the required power is reduced, there are fewer wires, and the fixed cost is reduced. Moreover, the heat generation is lower, which ensures the reliability of the device and can extend the service life of the device.

BRIEF DESCRIPTION OF THE DRAWINGS

The specific structure of the present application will be described in detail hereinafter with reference to the drawings.

100—the first switch component; 110—a force applying block; 120—a switching rotating shaft; 130—a motor; 141—a magnet; 150—a bracket; 200—the second switch component; 210—a bridge contactor; 220—the first fixed contactor; 221—a corresponding contact of the first fixed contactor; 230—the second fixed contactor; 231—a corresponding contact of the second fixed contactor; 241—a Hall sensor; 250—a spring; 260—a rigid-flex board; 270—a probe control board; 300—a fixed board; 400—an ultrasonic probe.

DESCRIPTION OF THE EMBODIMENTS

In order to explain in detail the technical content, structural features, achieved objectives and effects of the present application, the following description will be described in detail in conjunction with the embodiments and the accompanying drawings.

Figure 1:
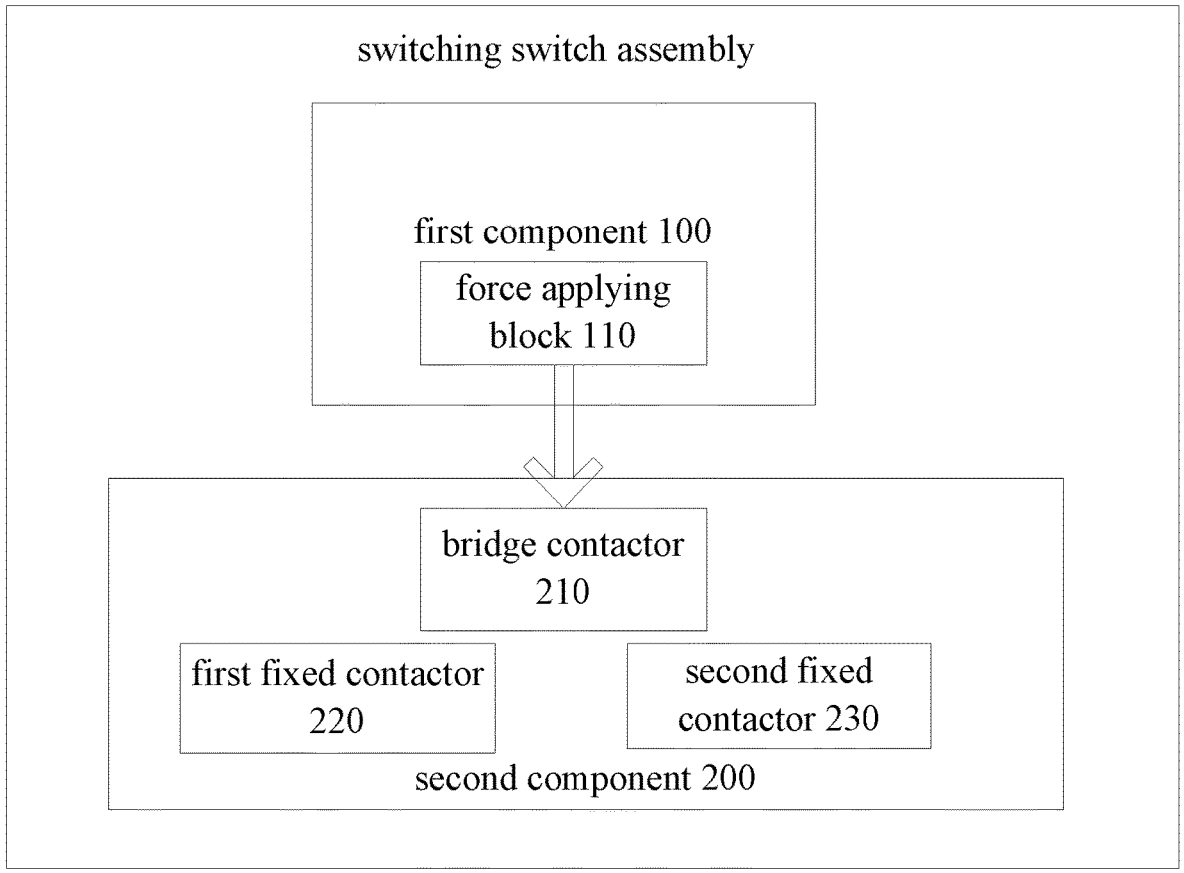
FIG. 1 is a structural block diagram of the first embodiment of a probe switching device according to the present application.
Figure 2:
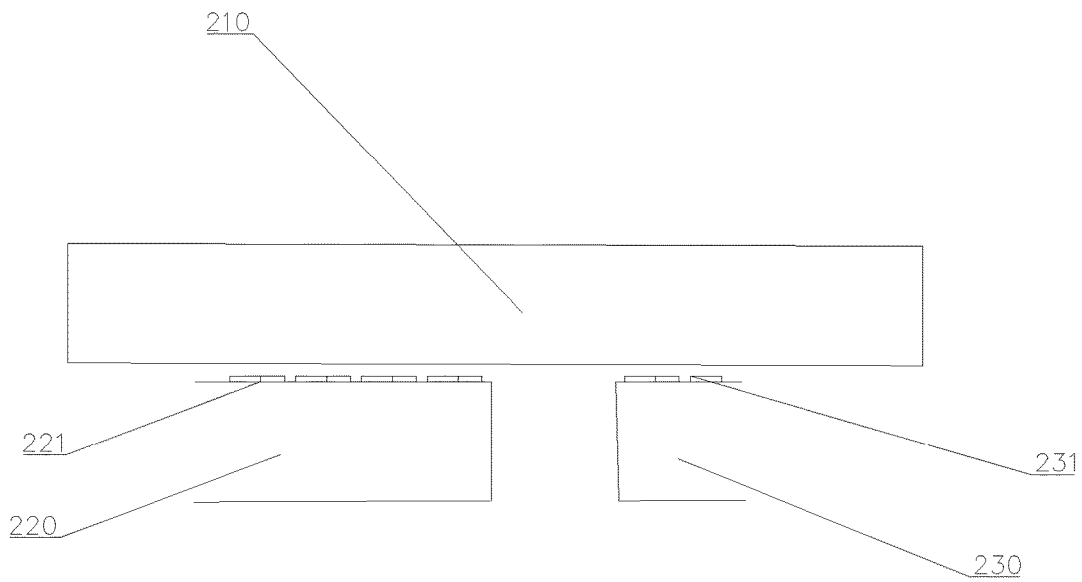
FIG. 2 is a schematic structural diagram of the first embodiment of a probe switching device according to the present application.

Refer to FIGS. 1 and 2. FIG. 1 is a structural block diagram of the first embodiment of a probe switching device of the present application; FIG. 2 is a schematic structural diagram of the first embodiment of a probe switching device of the present application. In order to solve the above technical problem, the technical solution adopted by the present application is: a switching device of an ultrasonic probe 400, comprising at least two switching switch assemblies and at least two ultrasonic probes 400, wherein each of the switching switch assemblies corresponds to each of the ultrasonic probes 400, each of the switching switch assemblies comprises the first switch component 100 and the second switch component 200, the first switch component 100 is provided with a force applying block 110, and the second switch component 200 mainly consists of the first fixed contactor 220, the second fixed contactor 230 and a bridge contactor 210, the bridge contactor can be controlled to be in contact with or be disengaged from the two fixed contactors by moving the bridge contactor 220, and each of the ultrasonic probes 400 corresponding to each of the switching switch assemblies is connected with the first fixed contactor 220.

In particular, when the force applying block 110 is pressed against the bridge contactor 210, the bridge contactor 210 is in contact with the first fixed contactor 220 and the second fixed contactor 230, respectively, in such a way that the first fixed contactor 220 and the second fixed contactor 230 are electrically connected.

In particular, an electrical signal passes through the bridge contactor 210 and the two fixed contactors to reach the corresponding probe, and the corresponding probe converts the collected information into an electrical signal, and transmits the electrical signal back, the current ultrasonic probe 400 is switched to the ultrasonic probe 400 corresponding to the switching switch assembly.

Specifically, the bridge contactor 210 comprises a pressing block and a bridge board, the pressing block is connected to the bridge board, and the bridge board is close to the first fixed contactor 220 and the second fixed contactor 230. The bridge board functions as circuit bridge conduction, the pressing block is mainly made of non-conductive material, and the force applying block 110 acts on the pressing block.

Thereby, the ultrasonic probe 400 can be switched using a switching switch assembly without using a relay, the force applying block 110 acts on the bridge contactor 210 to connect the first switch component 100 and the second switch component 200, which can reduce the overall signal consumption, help enhance the transmission effect, and will not result in cross interference of signals, and the image quality is high. Correspondingly, the required power is reduced, there are fewer wires, and the fixed cost is reduced. Moreover, the heat dissipation is superior, which ensures the reliability of the device.

In this embodiment, the force applying block 110 can be controlled to press against the bridge contactor 210 through various devices.

Figure 3:
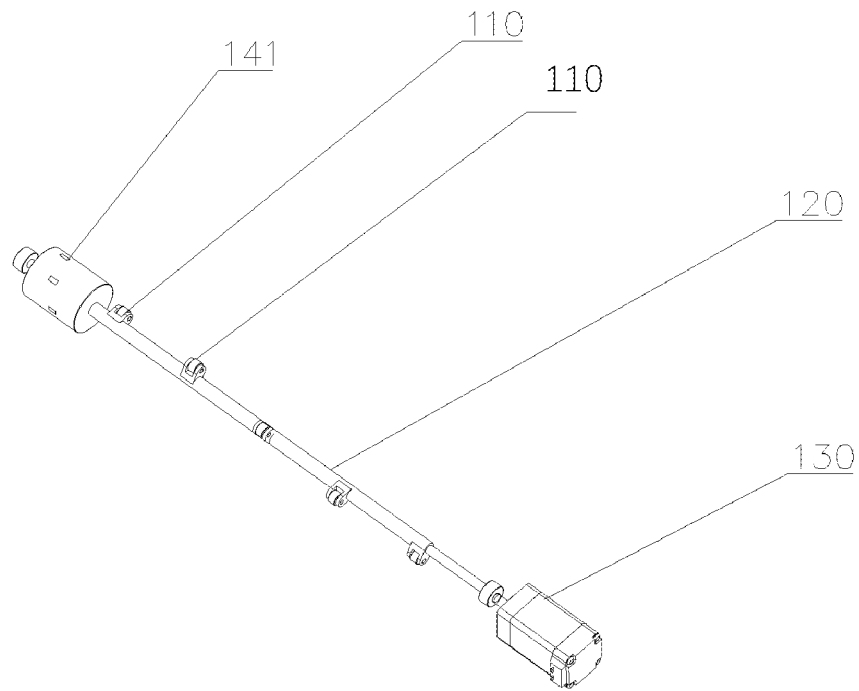
FIG. 3 is a structural diagram of a switching rotating shaft of the second embodiment of a probe switching device according to the present application.

Further, refer to FIG. 3, which is a structural diagram of a switching rotating shaft 120 of the second embodiment of a probe switching device according to the present application.

The switching device of the ultrasonic probe 400 further comprises at least one switching rotating shaft 120; the first switch component 100 is arranged in the axial direction of the switching rotating shaft 120.

The first switch component 100 is arranged on the switching rotating shaft 120, that is, the switch assembly can be operated by the rotation of the switching rotating shaft 120, in such a way that the force applying block 110 of the first switch component 100 is controlled to press against the corresponding second switch component 200, and the corresponding circuit is conducted, so as to switch to the corresponding ultrasonic probe 400.

The first switch component 100 is arranged in the axial direction of the switching rotating shaft 120, which can exert the advantage of the length of the switching rotating shaft 120 and can press more quickly. It can be understood that when the force applying block 110 of the first switch component 100 is horizontally arranged, the second component described above is circumferentially distributed outside the switching rotating shaft 120 in the axial direction of the switching rotating shaft 120. The overall shape is similar to a barrel-shaped structure and a switching rotating shaft 120 is provided therein.

Alternatively, if the size of the force applying block 110 is not suitable for applying force to the bridge contactor 210, then a long object may be provided on the bridge contactor 210 to reduce the corresponding switching difficulty. Alternatively, when the second component has to be distributed irregularly for some special needs, the force applying block 110 of the corresponding first switch component 100 may be changed in shape. For example, the block shape is changed into a hollow barrel shape, a strip shape, a spiral shape and other structures.

Specifically, the bridge contactor 210 corresponds to the position between the first fixed contactor 220 and the second fixed contactor 230, a contact on a connecting block of the bridge contactor 210, a corresponding contact 221 of the first fixed contactor and a corresponding contact 231 of the second fixed contactor are all normally open. Each connecting board is connected to a corresponding socket of the ultrasonic probe 400, and the ultrasonic probe 400 is switched by switching the connecting board.

Figure 4:
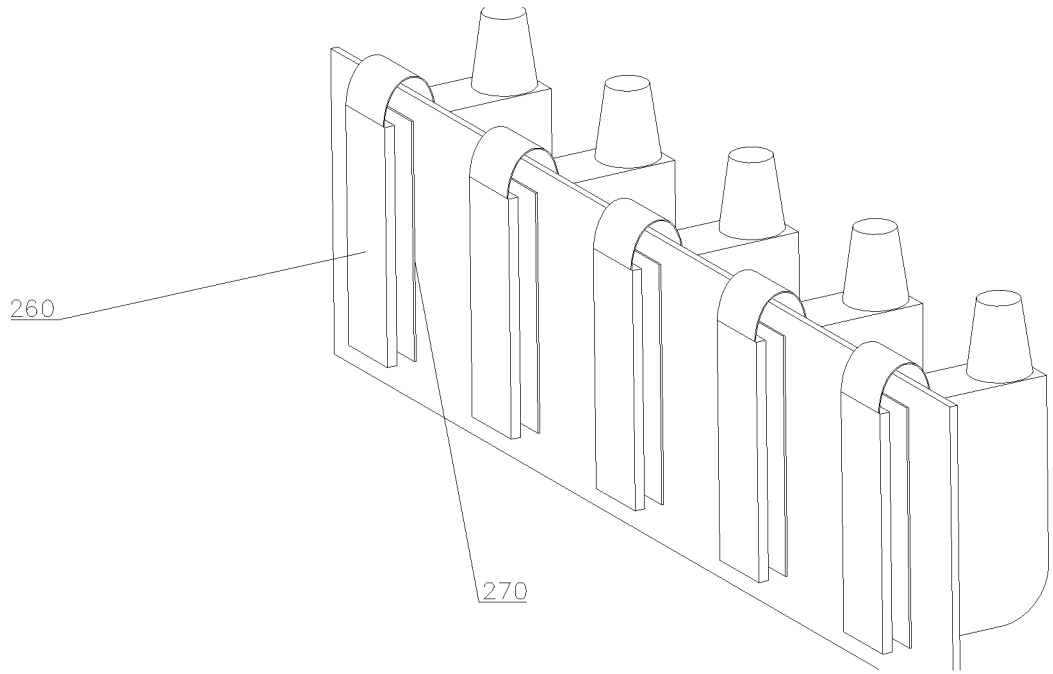
FIG. 4 is a schematic diagram of the connection between a probe and a probe control board of the third embodiment of a probe switching device according to the present application.
Figure 5:
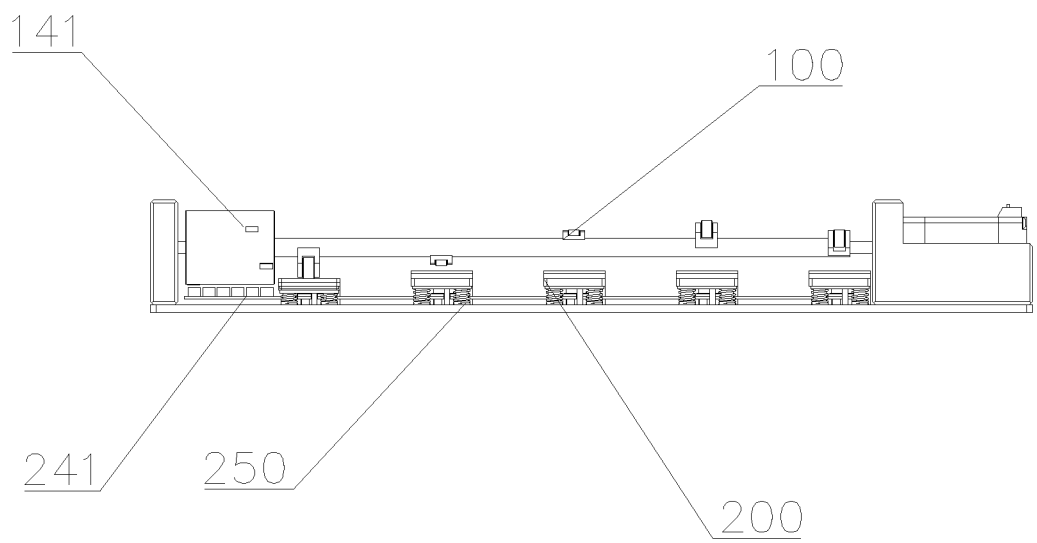
FIG. 5 is a cross-sectional structure diagram of the third embodiment of a probe switching device according to the present application.
Figure 6:
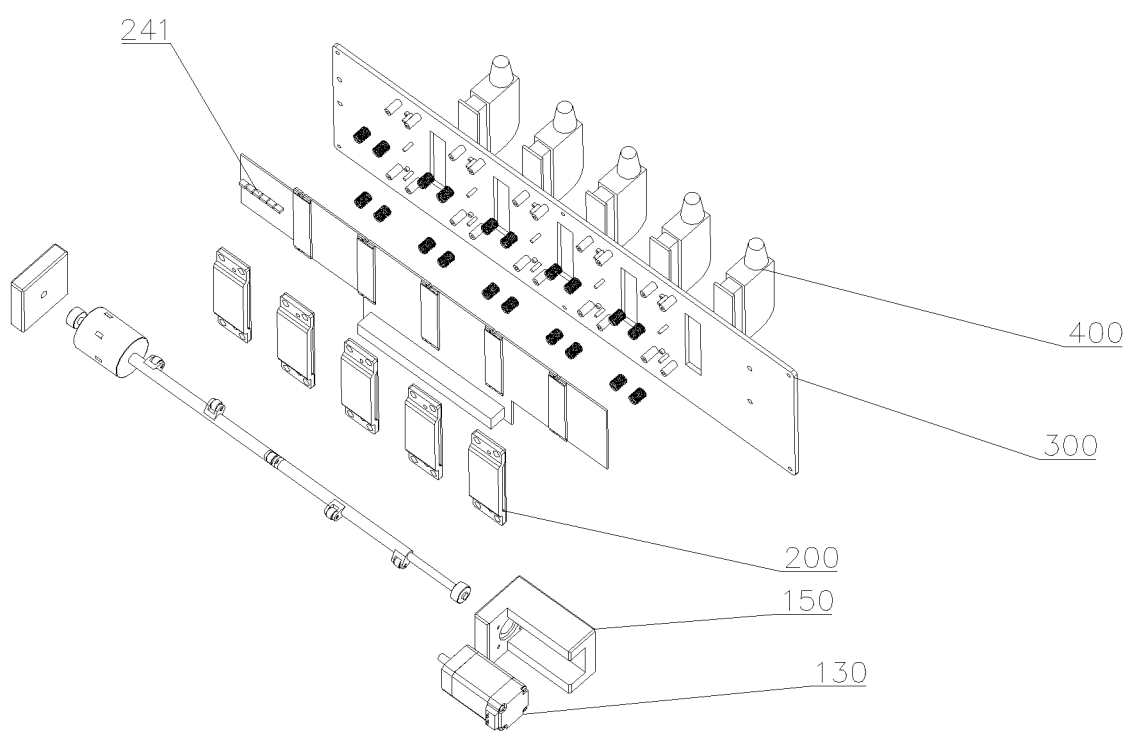
FIG. 6 is an exploded view of the third embodiment of a probe switching device according to the present application.

Refer to FIG. 4, FIG. 5 and FIG. 6. FIG. 4 is a schematic diagram of the connection between a probe and a probe control board of the third embodiment of a probe switching device according to the present application. FIG. 5 is a cross-sectional structure diagram of the third embodiment of a probe switching device according to the present application. FIG. 6 is an exploded view of the third embodiment of a probe switching device according to the present application.

In another embodiment, the probe socket is separately made on a rigid-flex composition board. One end of the rigid-flex board 260 is located above the probe control board 270, and contacts are arranged on the rigid-flex board 260. In the operating state, the force applying part of the rotating shaft pushes the rigid-flex board 260 into the probe control board 270 and contact therewith, and the wire is conducted.

Further, the first switch component 100 is circumferentially distributed on the switching rotating shaft 120, and the force applying block 110 faces the outside of the switching rotating shaft 120. Thus, the second component can be arranged horizontally, which is convenient for the operator to remember the ultrasonic probe 400 corresponding to each switch, and is convenient for the operator to operate the switching rotating shaft 120. Moreover, the cost is relatively low. In this state, when the force applied to the switching rotating shaft 120 comes from a plurality of directions, and the overall deformation is small.

Further, the second switch component 200 is provided with an elastic structure, the elastic structure is provided between the first fixed contactor 220 and the second fixed contactor 230, the elastic structure corresponds to the bridge contactor 210, and the elastic structure is electrically connected with the bridge contactor 210.

The second switch is provided with an elastic structure, and the circuit of the ultrasonic probe 400 just used can be disconnected before switching the next ultrasonic probe 400, thereby reducing manpower operation, reducing the probability of occurrence of invalid operation, weakening manpower cost, and ensuring the overall operation effect.

The above elastic structure may be at least one spring 250 or at least one elastic mechanism.

Further, the switching device of the ultrasonic probe 400 further comprises a control board of the ultrasonic probe 400, at least two first sensing components and at least two second sensing components, each of the first sensing components is circumferentially distributed on the switching rotating shaft 120, and each of the second sensing components is provided on the control board of the ultrasonic probe 400, the sensor corresponds to the signal source, and the sensor corresponds to the switching switch assembly, the rotation of the switching rotating shaft 120 is controlled by changing the positional relationship between the sensor and the signal source, thereby switching the ultrasound probe 400.

In an embodiment, each of the second sensing components comprises a sensor, each of the first components comprises a signal source, and a plurality of signal sources are provided at one end of the switching rotating shaft 120 and are distributed circumferentially at one end of the switching rotating shaft 120 in the axial direction of the switching rotating shaft 120; and the sensor is provided at the corresponding position of the control board of the ultrasonic probe 400. In another embodiment, each of the first sensing components and each of the second sensing components comprise sensors, and each of the first sensing components and each of the second components comprise signal sources.

Alternatively, the sensor is a Hall sensor 241, and the signal source is a magnet 140. The Hall sensor 241 is used, which is wide in operating temperature range, high in the accuracy of the measuring magnet 140, more precise, uneasy to result in operation errors, long in service life, and conducive to reducing the cost of maintenance.

Alternatively, the sensor is a photoelectric sensor, and the signal source is a baffle. In this embodiment, the switching device of the ultrasound probe 400 further comprises a light source. The light emitted by the light source is blocked by the baffle, and the corresponding photoelectric sensor encodes. Further, the photoelectric sensor may be a photoelectric encoder, which converts the mechanical geometric displacement on the output shaft into a pulse or digital quantity through photoelectric conversion.

Further, a roller is provided on the outer side of the force applying block 110, thereby reducing the contact strength between the first switch component 100 and the second switch component 200, and enhancing the service life of the device.

Further, the switching device of the ultrasonic probe 400 further comprises a fixed board 300, the control board of the ultrasonic probe 400 is fixed to the fixed board 300, the switching rotating shaft 120 is suspended and connected to the fixed board 300, and the control board of the ultrasonic probe 400 is provided between the switching rotating shaft 120 and the fixed board 300.

Specifically, brackets 150 are provided at both ends of the switching rotating shaft 120 to ensure that the switching rotating shaft 120 is suspended and connected to the control board. As a result, the overall structure is combined, which reduces the difficulty of assembly and facilitates the assembly and transportation of the device.

Preferably, the switching device of the ultrasonic probe 400 further comprises a rotatable structure and a power structure, the power structure drives the switching rotating shaft 120 through the rotatable structure, and the sensor controls the rotation of the rotatable structure.

In particular, the power structure comprises a motor 130, and the rotatable structure comprises one or more selected from the group consisting of coupler, gear mechanism and rope connecting mechanism.

The rotatable structure is applied to ensure the rotation effect of the switching rotating shaft 120, and avoid the problem of difficulty in rotation. The power structure is applied, which can be controlled by a sensor to directly act on the switching rotating shaft 120, thereby ensuring the switching effect.

In summary, the bridge contactor 210 is used to connect the first fixed contactor 220 and the second fixed contactor 230, the signal transmission distance is reduced, and the transmission quality and speed are also increased; the switching devices of the same number of ultrasonic probe 400 can reduce the cost without using the relay; the number of components is reduced, the control board can be made smaller, and the required cabinet is also smaller, which can reduce the device space occupation; after the mechanical method is used, the number of connection lines is reduced significantly, reducing the difficulty in wiring, facilitating production and installation, reducing the operation current, and saving energy.

The above is merely an embodiment of the present application, rather than limit the patent scope of the present application. Any equivalent structure or equivalent process transformation made using the description and drawings of the present application, which is directly or indirectly used in other related technical fields, is similarly included in the patent protection scope of the present application.

What is claimed is:

1. A probe switching device, comprising at least two switching switch assemblies and at least two probes, wherein each of the switching switch assemblies corresponds to each of the probes, each of the switching switch assemblies comprises a first switch component and a second switch component, the first switch component is provided with a force applying block, the second switch component consists of two fixed contactors and a bridge contactor, each of the probes corresponding to each of the switching switch assemblies is connected to one of the two fixed contactors, and the bridge contactor is capable of being controlled to be in contact with or be disengaged from the two fixed contactors by moving the bridge contactor;

wherein when the force applying block is pressed against the bridge contactor, the bridge contactor is in contact with the two fixed contactors, in such a way that the two fixed contactors are electrically connected;

wherein an electrical signal passes through the bridge contactor and the two fixed contactors to reach the corresponding probe, the corresponding probe converts the collected information into an electrical signal and transmits the electrical signal, and after one of the probes receives the signal from the bridge contactor, the switching switch assemblies change which bridge connector is in the contacting state such that the probe being connected by the device advances to the next switching switch assembly corresponding to the next probe in the device;

wherein the probe switching device further comprises at least one switching rotating shaft, the first switch component is arranged in the axial direction of the switching rotating shaft;

wherein the probe switching device further comprises a probe control board, at least two first sensing components and at least two second sensing components, each of the first sensing components is circumferentially distributed on the switching rotating shaft, and each of the second sensing components is provided on the probe control board;

wherein each of the first sensing components comprises a sensor, each of the second sensing components comprises a signal source, the sensor corresponds to the signal source, the sensor corresponds to the switching switch assembly, and the sensor is used to control the on/off of the switching switch assembly.

2. The probe switching device of claim 1, wherein the bridge contactor comprises a pressing block and a connecting bridge, the pressing block is connected to the connecting bridge, the connecting bridge is close to the two fixed contactors, the connecting bridge is made of conductive material, the pressing block is made of non-conductive material, the force applying block acts on the pressing block.

3. The probe switching device of claim 2, wherein the first switch component is circumferentially distributed on the switching rotating shaft.

4. The probe switching device of claim 1, wherein the second switch component is provided with an elastic structure, the elastic structure is provided between the two fixed contactors, and the elastic structure is electrically connected with the bridge contactor.

5. The probe switching device of claim 1, wherein a roller is provided on the outer side of the force applying block.

6. The probe switching device of claim 1, wherein the probe switching device further comprises a fixed board, the probe control board is fixed to the fixed board, the switching rotating shaft is suspended and connected to the fixed board, and the probe control board is provided between the switching rotating shaft and the fixed board.

7. The probe switching device of claim 1, wherein the probe switching device further comprises a rotatable structure and a power structure, the power structure drives the switching rotating shaft through the rotatable structure, and the sensor controls the rotation of the rotatable structure;

wherein the power structure comprises a motor, the rotatable structure comprises one or more selected from the group consisting of coupler, gear mechanism and rope connecting mechanism.

8. The probe switching device of claim 1, wherein the sensor is a Hall sensor or a photoelectric sensor, and the signal source is a magnet or a baffle.

* * * * *